United States Patent
Tate et al.

(10) Patent No.: US 9,821,448 B2
(45) Date of Patent: Nov. 21, 2017

(54) ERGONOMIC THERMOLUMINESCENT DOSIMETER ADAPTER

(71) Applicants: John Estabillo Tate, Chesapeake, VA (US); Curtis Wayne Gent, Sunburry, NC (US); D. Suzanne Gregor, Norfolk, VA (US); William Andrew Harrell, Camden, NC (US)

(72) Inventors: John Estabillo Tate, Chesapeake, VA (US); Curtis Wayne Gent, Sunburry, NC (US); D. Suzanne Gregor, Norfolk, VA (US); William Andrew Harrell, Camden, NC (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 955 days.

(21) Appl. No.: 13/625,919

(22) Filed: Sep. 25, 2012

(65) Prior Publication Data
US 2014/0083060 A1    Mar. 27, 2014

(51) Int. Cl.
*G01T 1/11* (2006.01)
*B25G 1/10* (2006.01)
*B65B 69/00* (2006.01)

(52) U.S. Cl.
CPC .............. *B25G 1/102* (2013.01); *B65B 69/00* (2013.01); *G01T 1/11* (2013.01)

(58) Field of Classification Search
CPC .... G01T 1/10; G01T 1/11; G01T 1/16; G21K 2004/06
USPC .................................................. 250/484, 482
See application file for complete search history.

(56) References Cited

U.S. PATENT DOCUMENTS

| | | | | |
|---|---|---|---|---|
| 2,832,266 | A * | 4/1958 | Sunderland | 89/195 |
| 2,975,680 | A * | 3/1961 | Wilson | 89/196 |
| 3,786,254 | A * | 1/1974 | Yamashita et al. | 250/484.3 |
| 3,894,238 | A * | 7/1975 | Cox et al. | 250/484.3 |
| 3,911,283 | A * | 10/1975 | Williams | 250/483.1 |
| 4,346,511 | A * | 8/1982 | Jones et al. | 29/458 |
| 4,465,936 | A * | 8/1984 | Ishiguro et al. | 250/484.3 |
| 4,494,002 | A * | 1/1985 | Maples | G01T 1/142 250/377 |
| 4,790,575 | A * | 12/1988 | Tate | 289/17 |
| 4,922,115 | A * | 5/1990 | Mawatari et al. | 250/484.5 |

(Continued)

OTHER PUBLICATIONS

Thermo electronic Corporation model 8800 plus automatic TLD card reader with WinREMS TM, operators manual publication No. 8800-W-O-0802 008, Aug. 18, 2002, p. 1-4 and 1-5.*

*Primary Examiner* — Casey Bryant

(57) ABSTRACT

The ergonomic thermoluminescent dosimeter adapter provides ergonomic design that reduces the risk of repetitive motion injury. The ergonomic thermoluminescent dosimeter adapter includes a form fitting hand trigger and a handle portion mounted on a base. The handle portion has a slot adapted to receive the TLD tool. The TLD tool inserts into the adapter and fastening devices secure the TLD tool to the adapter. In operation, the adapter base is positioned on a flat surface such as a table and adjusted to a comfortable working height until the hand trigger is in a comfortable gripping position. The adapter is held with one hand and the hand trigger is squeezed with the other hand until the targeted TLD holder opens.

23 Claims, 9 Drawing Sheets

(56) References Cited

U.S. PATENT DOCUMENTS

| | | | |
|---|---|---|---|
| 4,975,589 A * | 12/1990 | Chamberlain et al. | 250/484.3 |
| 4,999,503 A * | 3/1991 | Andru | 250/472.1 |
| 5,004,921 A * | 4/1991 | Moscovitch | 250/337 |
| 5,052,140 A * | 10/1991 | Smith | 42/7 |
| 5,162,655 A * | 11/1992 | Peters | 250/496.1 |
| 5,179,281 A * | 1/1993 | Tawil et al. | 250/337 |
| 5,295,683 A * | 3/1994 | Tate | 473/406 |
| 5,572,027 A * | 11/1996 | Tawil et al. | 250/336.1 |
| 5,572,028 A * | 11/1996 | Moscovitch et al. | 250/337 |
| 5,950,296 A * | 9/1999 | Tatsumi et al. | 29/426.5 |
| 6,050,464 A * | 4/2000 | Ramsey et al. | 224/196 |
| 6,928,764 B2 | 8/2005 | Freed | 42/71.02 |
| 7,046,764 B1 * | 5/2006 | Kump | 378/117 |
| D527,067 S * | 8/2006 | Sellars | D22/108 |
| 7,173,244 B2 | 2/2007 | Tomita et al. | 250/336.1 |
| 7,637,049 B1 | 12/2009 | Samson et al. | 42/108 |
| 7,819,298 B2 * | 10/2010 | Hall et al. | 227/176.1 |
| 7,861,906 B2 * | 1/2011 | Doll et al. | 227/175.2 |
| 7,918,376 B1 | 4/2011 | Knodel et al. | 227/175.1 |
| 7,959,051 B2 * | 6/2011 | Smith et al. | 227/176.1 |
| 8,011,551 B2 * | 9/2011 | Marczyk et al. | 227/175.1 |
| 8,022,374 B2 | 9/2011 | Seo et al. | 250/484.5 |
| 8,156,677 B2 | 4/2012 | Glock | 42/71.02 |
| 8,469,252 B2 * | 6/2013 | Holcomb et al. | 227/175.1 |
| 8,479,969 B2 * | 7/2013 | Shelton, IV | 227/180.1 |
| 8,517,244 B2 * | 8/2013 | Shelton et al. | 227/180.1 |
| 8,584,390 B1 * | 11/2013 | Fraher et al. | 42/71.02 |
| 8,601,932 B1 * | 12/2013 | Karfiol et al. | 89/144 |
| 8,604,415 B2 * | 12/2013 | Micke et al. | 250/252.1 |
| 8,616,431 B2 * | 12/2013 | Timm et al. | 227/178.1 |
| 8,720,100 B1 * | 5/2014 | Calvert | 42/90 |
| 8,789,741 B2 * | 7/2014 | Baxter et al. | 227/180.1 |
| 8,820,603 B2 * | 9/2014 | Shelton et al. | 227/175.1 |
| 8,926,598 B2 * | 1/2015 | Mollere et al. | 606/1 |
| 8,939,343 B2 * | 1/2015 | Milliman et al. | 227/176.1 |
| 2004/0031181 A1* | 2/2004 | Freed | 42/71.02 |
| 2005/0011349 A1* | 1/2005 | Rohrbaugh et al. | 89/147 |
| 2005/0199818 A1* | 9/2005 | Tomita et al. | 250/370.01 |
| 2005/0242289 A1* | 11/2005 | Grichnik et al. | 250/370.07 |
| 2006/0075604 A1* | 4/2006 | Chang | 16/421 |
| 2007/0241261 A1* | 10/2007 | Wendt | 250/221 |
| 2009/0071053 A1* | 3/2009 | Thomele et al. | 42/1.01 |
| 2009/0181808 A1* | 7/2009 | Tate | 473/408 |
| 2009/0230168 A1* | 9/2009 | Coleman et al. | 227/175.1 |
| 2010/0110439 A1* | 5/2010 | Gruler et al. | 356/440 |
| 2010/0148096 A1* | 6/2010 | Neushul | 250/585 |
| 2011/0024640 A1* | 2/2011 | Kahilainen et al. | 250/370.07 |
| 2011/0036887 A1* | 2/2011 | Zemlok et al. | 227/175.1 |
| 2011/0047847 A1* | 3/2011 | Hughes et al. | 42/1.01 |
| 2011/0084112 A1* | 4/2011 | Kostrzewski | 227/176.1 |
| 2011/0088539 A1* | 4/2011 | Oz | 89/1.4 |
| 2011/0265366 A1* | 11/2011 | Hinds, Jr. | 42/94 |
| 2012/0085010 A1* | 4/2012 | Cook | 42/7 |
| 2012/0125189 A1* | 5/2012 | McLean, III | 89/132 |
| 2012/0292367 A1* | 11/2012 | Morgan et al. | 227/175.1 |
| 2013/0153636 A1* | 6/2013 | Shelton et al. | 227/176.1 |
| 2013/0181036 A1* | 7/2013 | Olson et al. | 227/180.1 |
| 2014/0005702 A1* | 1/2014 | Timm et al. | 606/169 |
| 2014/0005705 A1* | 1/2014 | Weir et al. | 606/169 |
| 2014/0083060 A1* | 3/2014 | Tate et al. | 53/492 |
| 2014/0123990 A1* | 5/2014 | Timmermans | 131/328 |
| 2014/0183378 A1* | 7/2014 | Yoder et al. | 250/458.1 |
| 2014/0191015 A1* | 7/2014 | Shelton, IV | 227/178.1 |
| 2014/0367447 A1* | 12/2014 | Woodard et al. | 227/176.1 |

* cited by examiner

(12)  United States Patent

ERGONOMIC THERMOLUMINESCENT DOSIMETER ADAPTER

STATEMENT OF GOVERNMENT INTEREST

The invention described herein was made in the performance of official duties by one or more employees of the Department of the Navy, and thus, the invention herein may be manufactured, used or licensed by or for the Government of the United States of America for governmental purposes without the payment of any royalties thereon or therefor.

RELATED APPLICATIONS

This patent application claims priority from U.S. Provisional Patent Application No. 61/613,085, filed on Mar. 20, 2012, which is hereby incorporated by reference in its entirety.

BACKGROUND OF THE INVENTION

Field of the Invention

The present invention relates to an ergonomic thermoluminescent dosimeter adapter and a method for opening a package of thermoluminescent dosimeter (TLD hereafter) using the adapter.

Description of the Related Art

A thermoluminescent dosimeter is used to measure radiation exposure of a worker. A conventional TLD opening tool poses an ergonomic problem because the tool is made from metal and the width of the tool is less than 2 inches. Use of the conventional tool requires the worker to move the wrist frequently in flexion or extension (up or down) and in ulnar and radial (side to side) movements in order to depress a raised steel band and then open the TLD holder. A pinch grip by the thumb is also needed to depress the raised steel band. Rapidly and frequently producing these motions for extended periods are considered to be hazard risk factors which can lead to repetitive motion injuries. In one application, on average, four to eight TLD holders may be opened by an employee every minute. Over a thousand may be processed in a night and several thousand by the end of a week. Hence there is a need for an adapter for the conventional tool and a method of using the adapter that would eliminate or reduce the amount of repetitive motions in the process of opening a TLD.

SUMMARY OF THE INVENTION

The ergonomic thermoluminescent dosimeter adapter overcomes the shortcomings of the conventional tool for opening an ergonomic thermoluminescent dosimeter by providing ergonomic design that reduces the risk of repetitive motion injury.

In one embodiment, the ergonomic thermoluminescent dosimeter adapter includes a form fitting hand trigger and a handle portion mounted on a base. The handle portion has a slot adapted to receive the TLD tool. The adapter may be formed of a high grade plastic or any other suitable material and may be contoured, wrapped or molded with foam, neoprene rubber or the like for ease and comfort.

The TLD tool inserts into the adapter and then is pushed down against the trigger portion until the trigger portion contacts or engages a thumb actuator of the TLD tool. Fastening devices then secure the TLD tool to the adapter.

In operation, the adapter base is positioned on a flat surface such as a table and adjusted to a comfortable working height until the hand trigger is in a comfortable gripping position. The adapter is held with one hand in the same orientation as originally designed for the TLD tool. The hand trigger is then squeezed with the other hand until the targeted TLD holder opens.

Further features and advantages will appear more clearly on a reading of the detailed description, which is given below by way of example only and with reference to the accompanying drawings.

DETAILED DESCRIPTION

Figure 9:
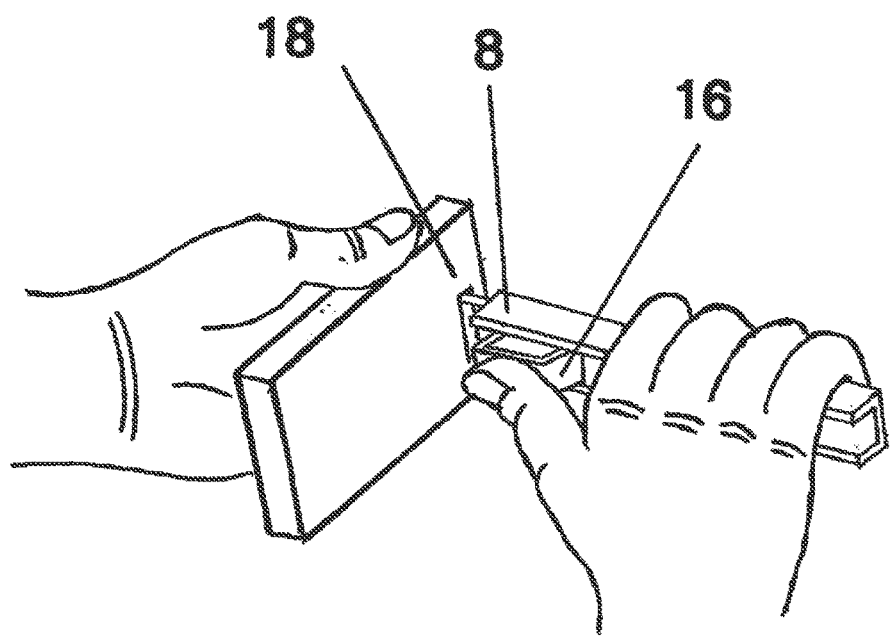
FIG. 9 shows a conventional TLD opening tool in use.

The ergonomic thermoluminescent dosimeter adapter ("adapter") 10 (FIG. 2) is an accessory device connectable to a tool 8 (FIG. 2) used to open a thermoluminescent dosimeter ("TLD") holder 18 (FIG. 9) and provides an ergonomic gripping surface to operate the tool 8. The adapter's ergonomic design reduces the risk of repetitive motion injury such as carpal tunnel to the hand and wrist of operators of the adapter.

The optimal position of the wrist is one that is neutral with no deviations. The adapter 10 is designed to cooperate with a TLD tool 8 made by Thermo Fisher Scientific. The adapter 10, with or without modifications, may also be used with a tool made by a different manufacturer or of a different design. The Thermo Fisher Scientific tool 8 is formed of metal with a width of less than two inches. The adapter 10 which connects to the TLD tool 8 allows for neutral positioning of the wrist and eliminates the thumb grip to depress the raised steel band, and hence lowers the risk of musculoskeletal injury.

Figure 1:
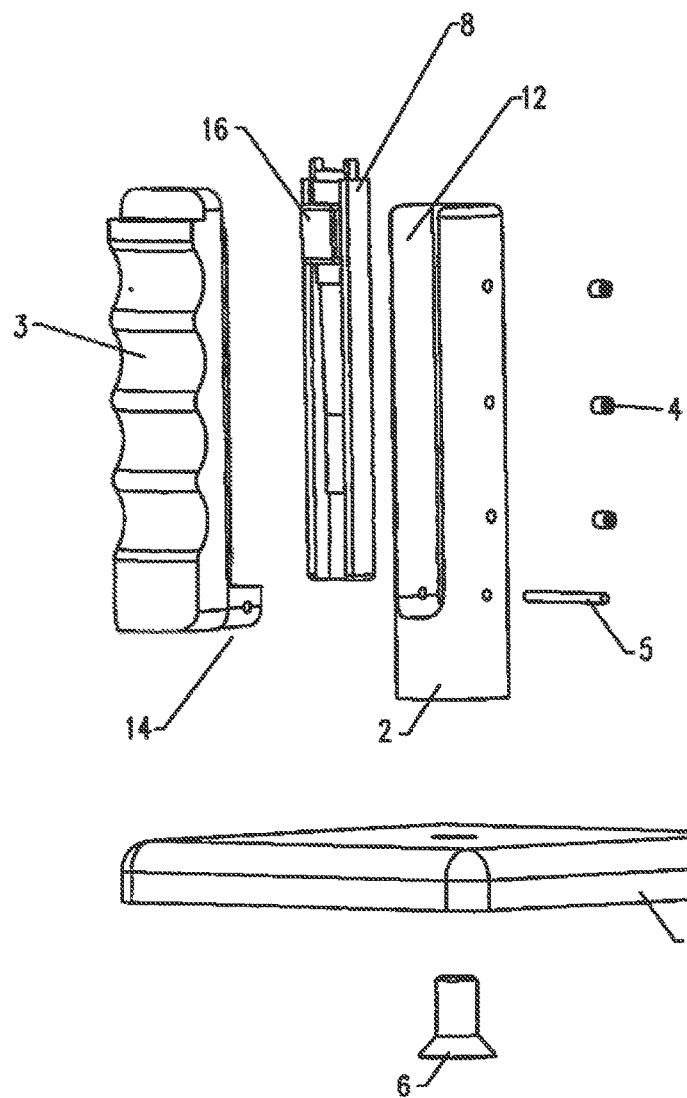
FIG. 1 shows details of the assembly of the conventional TLD opening tool and an adapter for the tool.
Figure 2:
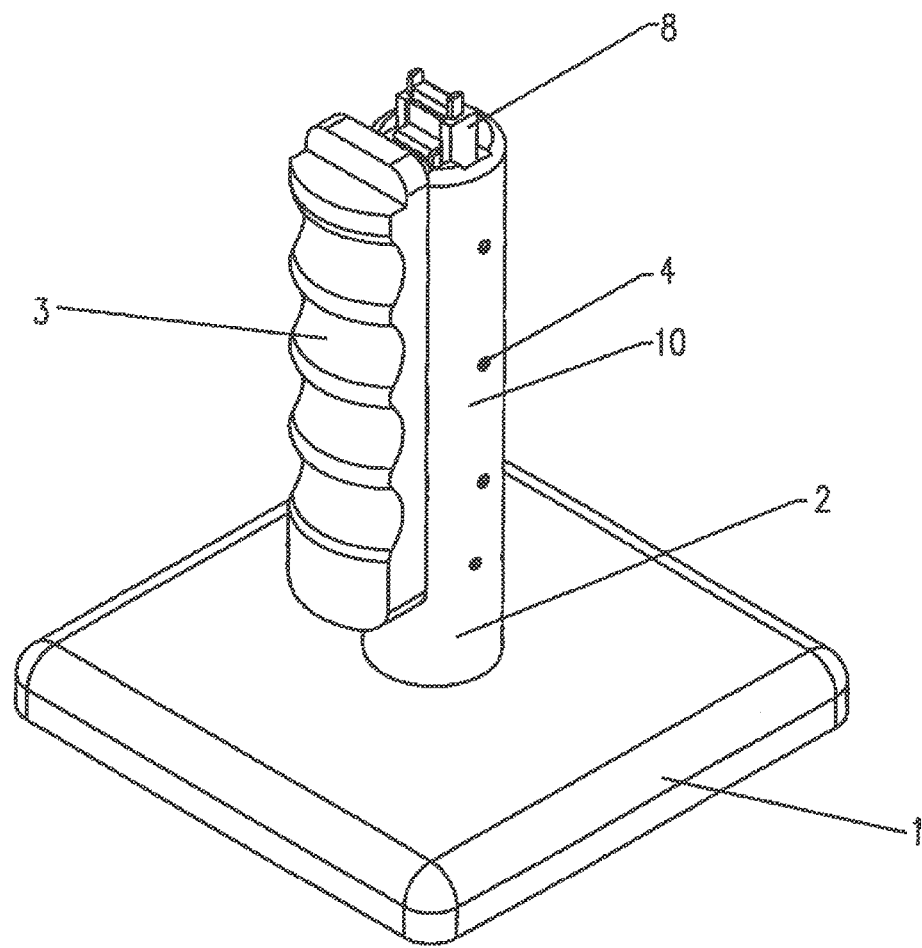
FIG. 2 shows an isometric view of the conventional TLD opening tool assembled with an adapter for the tool.
Figure 3:
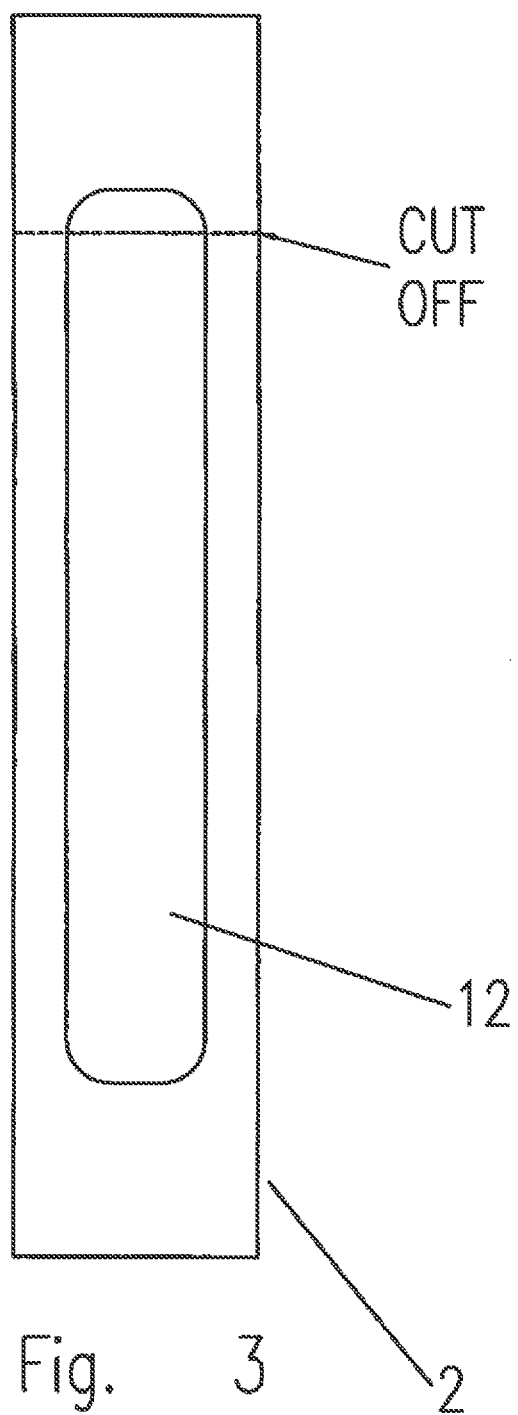
FIG. 3 shows details of the adapter handle of the adapter of FIG. 2.
Figure 4:
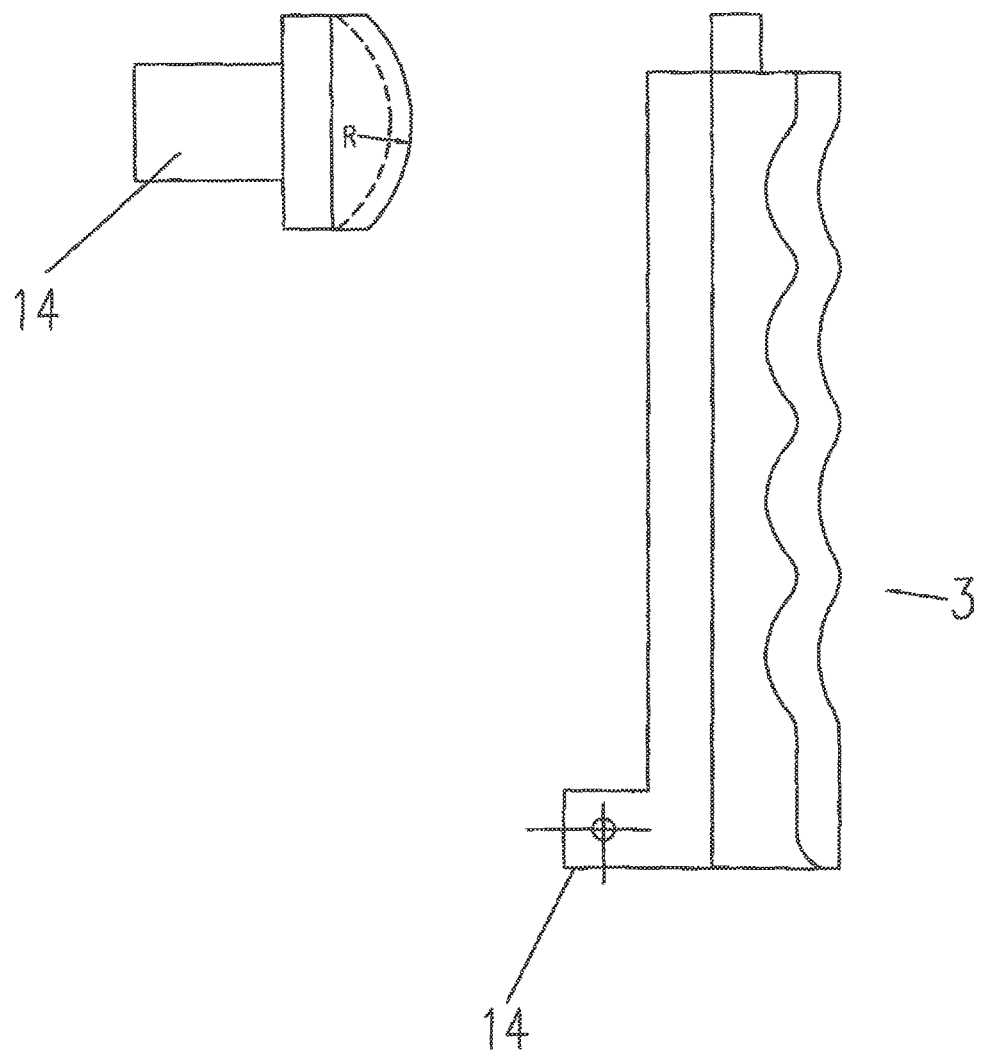
FIG. 4 shows the details of the adapter trigger on the adapter handle of the adapter of FIG. 2.
Figure 5:
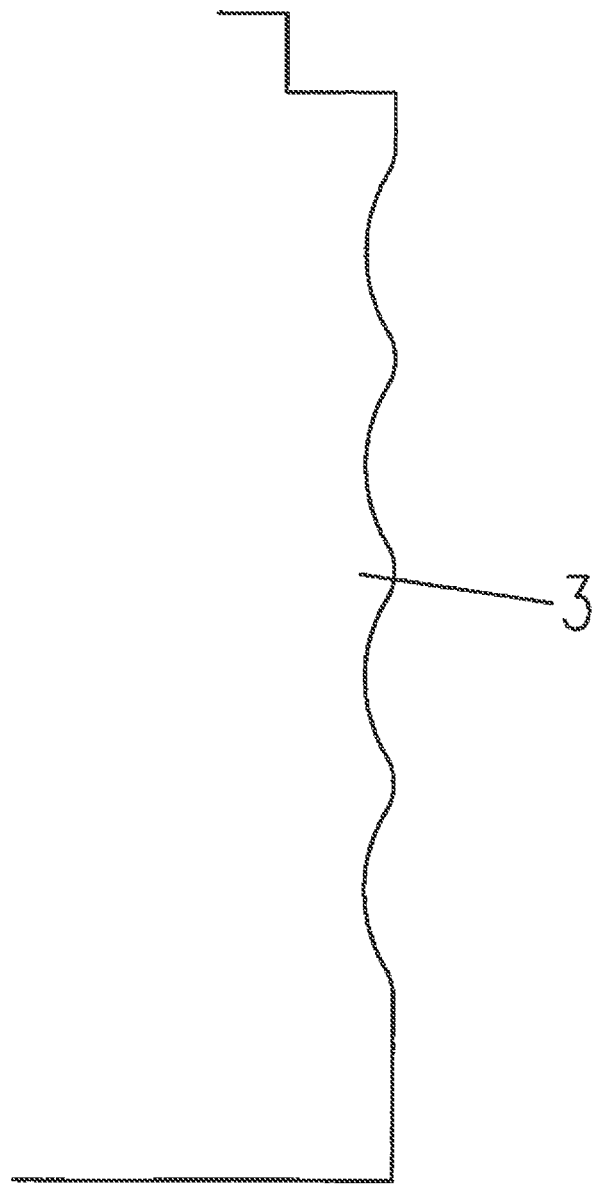
FIG. 5 another view of the adapter trigger on the adapter handle of the adapter of FIG. 2.
Figure 6:
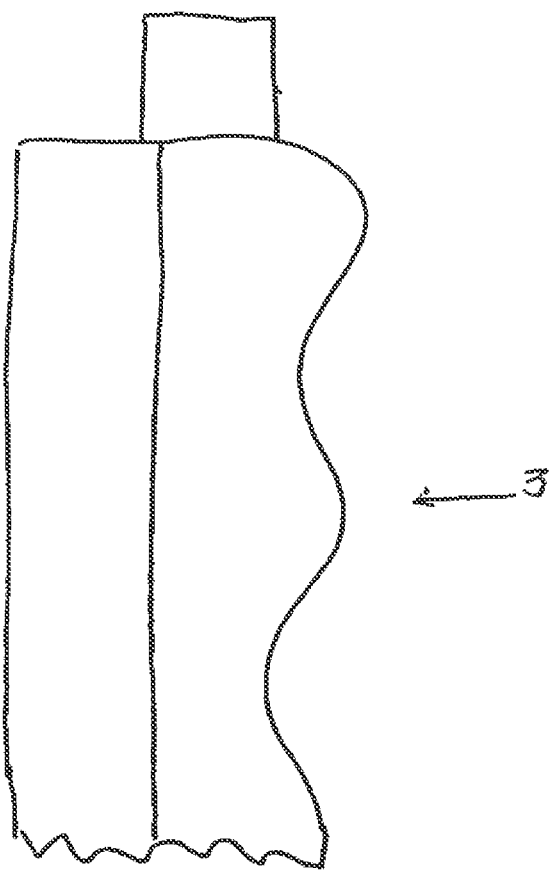
FIG. 6 shows the foot of the adapter trigger of FIG. 4.
Figure 8:
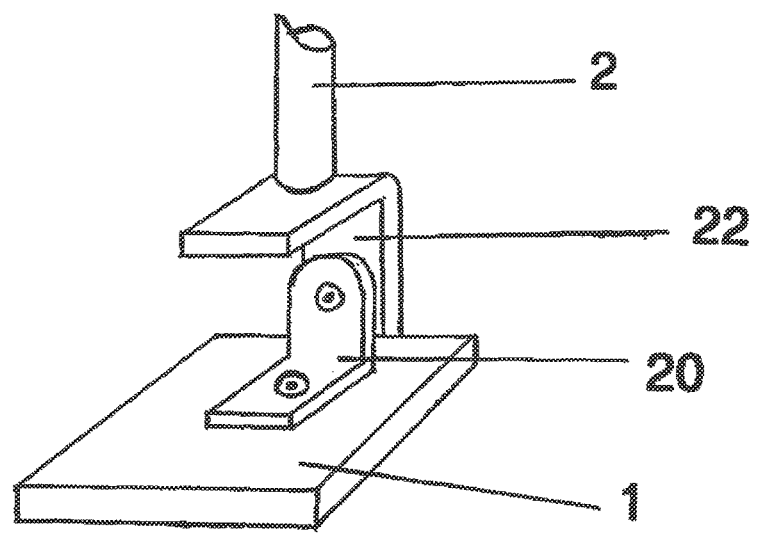
FIG. 8 shows an isometric view of an embodiment of adapter base and its connection to the adapter handle.

As shown in FIGS. 1 and 2, the adapter 10 includes a form fitting hand trigger mounted on a base. The hand trigger is composed of a handle portion 2 and a trigger portion 3. Trigger portion 3 is designed to receive four fingers of a hand. The handle portion 2 is formed with a slot 12, shown in FIG. 3, adapted to receive the TLD tool 8, shown in FIG. 1. One end of the handle portion 2 is cut off. The trigger portion 3 may be a four finger trigger (formed to receive four fingers of a hand—hence called form fitting), as shown in FIGS. 2, 4, 5, and 6, with a flange 14 configured to connect the trigger portion 3 to the handle portion 2. Alternatively, any other suitable means of connecting the trigger portion 3 to handle portion 2 may be used. The flange 14 is formed so as to slide into the slot 12. The base 1 (FIG. 2) has a generally flat bottom, and may have a hole defined therein adapted to receive a countersunk screw 6 to connect the base 1 to the handle portion 2, or may secure to the handle portion 2 with any other suitable means such as the arrangement shown in FIG. 8. FIG. 8 shows bracket 20 connected to base 1. Bracket 20 may be attached to base 1 using a screw or any other suitable means. Bracket 22 is movably connected to bracket 20 so as to allow relative motion between bracket 20 and bracket 22. Such relative motion allows one to adjust the location of the TLD adapter and its height. One end of bracket 22 is attached to handle portion 2 using a screw or any other suitable means.

The adapter 10 may be formed of a high grade plastic or any other suitable material. Either the handle portion 2 or the trigger portion 3 or both the handle portion 2 and trigger portion 3 may be contoured, wrapped or molded with foam, neoprene rubber or the like for ease and comfort. The adapter 10 can be produced on metal working equipment, such as lathes, milling machines, and other metal cutting/forming machines or may be molded.

Figure 7:
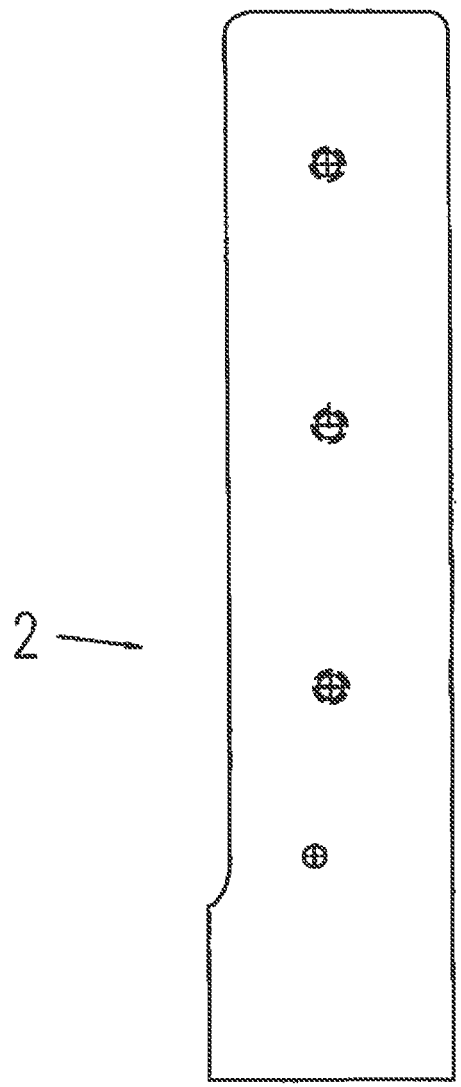
FIG. 7 shows location of set screw and pivot pin of the adapter handle of the adapter of FIG. 2.

The TLD tool 8 inserts into the adapter 10 with a flat side of the TLD tool positioned against a bottom of the slot 12 in the handle portion 2. The TLD tool 8 is then pushed down against the trigger portion 3 until the trigger portion 3 contacts or engages a thumb actuator 16 of the TLD tool 8. Fastening devices 4, 5 are then tightened until snug to secure the TLD tool 8 to the adapter 10. The fastening devices 4, 5 may be, for example, set screws which tighten the handle portion 2 against the TLD tool 8, and there may be, for example, a pin to secure the handle portion 2 to the trigger portion 3 of the adapter 10. One example of where holes may be drilled in the handle portion 2 to accommodate fastening devices 4, 5 is shown in FIG. 7.

In operation, the adapter base 1 may be positioned on a flat surface such as a table and adjusted to a comfortable working height until the hand trigger is in a comfortable gripping position. To achieve the comfortable trigger height, the base 1 may be set on a raised surface, or the base 1 may be altered as shown in FIG. 8. The height may be adjusted by taking advantage of the relative motion between bracket 20 and bracket 22. The adapter 10 is held with one hand in the same orientation as originally designed for the TLD tool 8. The hand trigger is then squeezed with the other hand until the targeted TLD holder 18, shown in FIG. 9, opens.

The ergonomic design of the adapter 10 positions the hand and wrist so as to reduce repetitive motions and squeezing of the hand to open the TLD holder 14.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A thermoluminescent dosimeter adapter comprising: a handle portion, the handle portion being adapted to receive a thermoluminescent dosimeter opening tool; a trigger portion attached to the handle portion, the handle portion and the trigger portion being capable of capturing the thermoluminescent dosimeter opening tool between them and forming an assembly; and a base attached to the assembly, wherein the trigger portion is operable by moving the fingers so as to close a hand in a fist.

2. The thermoluminescent dosimeter adapter of claim 1, wherein the trigger portion is attached to the handle portion using a fastener.

3. The thermoluminescent dosimeter adapter of claim 2, wherein the fastener is a pin.

4. The thermoluminescent dosimeter adapter of claim 1, wherein the base is attached to the assembly using a second fastener.

5. The thermoluminescent dosimeter adapter of claim 4, wherein the second fastener is a screw.

6. The thermoluminescent dosimeter adapter of claim 1, wherein the trigger portion has a contoured surface adapted to receive fingers of an operator.

7. The thermoluminescent dosimeter adapter of claim 1, further comprising a first bracket connected to the base and a second bracket connected to the handle portion, the first and the second brackets being movably connected to each other.

8. A method of opening a thermoluminescent dosimeter comprising: positioning a thermoluminescent dosimeter adapter on a surface, the adaptor having a handle portion, a trigger portion attached to the handle portion, the trigger portion and the handle portion being attached to a base, and a tool captured between the handle portion and the trigger portion in the adapter; placing the tip of the tool in contact with a thermoluminescent dosimeter holder; and pressing the trigger portion by closing one's hand in a first around the handle portion and the trigger portion.

9. A method of opening a holder for holding a thermoluminescent dosimeter, the method comprising:
    providing an adaptor having a handle portion having a first part and a second part, and a trigger portion having a first section and a second section, the second section of the trigger portion being pivotally attached to the handle portion,
    providing a tool having an actuator adapted to be depressed by a thumb;
    inserting the tool into the adapter such that the tool is captured between the handle portion and the trigger portion; and
    pressing the trigger portion by closing one's hand in a first around the handle portion and
    the trigger portion such that the pressing of the trigger portion pivots the trigger portion relative to the handle portion and the first part of the handle portion contacts the actuator of the tool and depresses the actuator.

10. The method of claim 9, further comprising:
    positioning the adapter in a free-standing manner on a surface by placing a base attached to the second part of the handle portion on the surface.

11. The method of claim 9, further comprising:
    providing a holder for a thermoluminescent dosimeter; and
    placing the tip of the tool in contact with the thermoluminescent dosimeter holder prior to pressing the trigger portion so that the holder opens upon the pressing of the trigger portion.

12. The method of claim 9, further comprising:
    gripping the handle portion and the trigger portion such that the fingers of one's hand wrap around the trigger portion prior to pressing the trigger portion.

13. The method of claim 9, further comprising:
    positioning the adapter in a freestanding manner on a surface by placing a base attached to the second part of the handle portion on the surface;
    providing a holder for a thermoluminescent dosimeter;
    gripping the handle portion and the trigger portion such that the fingers of one's hand wrap around the trigger portion prior to pressing the trigger portion; and placing the tip of the tool in contact with the thermoluminescent dosimeter holder prior to pressing the trigger portion so that the holder opens upon the pressing of the trigger portion.

14. An assembly for use with a thermoluminescent dosimeter, the assembly comprising:
   a tool having an actuator adapted to be depressed by a thumb; and
   an adapter having a handle portion, the handle portion having a first part and a second part and being adapted to receive the tool, and a trigger portion having a first section and a second section, and the second section of the trigger portion being pivotally attached to the second part of the handle portion,
   the tool being positioned between the handle portion and the trigger portion such that the first part of the trigger portion contacts the actuator of the tool when the trigger portion pivots relative to the handle portion to depress the actuator, wherein the trigger portion is adapted to receive fingers and is operable by moving the fingers so as to close a hand in a fist.

15. The assembly of claim 14, further comprising:
   a base attached to second part of the handle portion.

16. The assembly of claim 14, further comprising:
   a thermoluminescent dosimeter holder adapted to removably receive the tool.

17. The assembly of claim 14, further comprising:
   a contoured portion.

18. The assembly of claim 17, wherein
   the contoured portions include depressions to receive fingers.

19. The assembly of claim 18, wherein the contoured portions include four depressions to receive fingers.

20. The assembly of claim 14, further comprising:
   a thermoluminescent dosimeter holder adapted to removably receive the tool.

21. The assembly of claim 20, further comprising a dosimeter, the dosimeter being housed in the holder.

22. The assembly of claim 14, further comprising:
   a base attached to the second part of the handle portion; and
   a thermoluminescent dosimeter holder adapted to removably receive the tool, and
   wherein the trigger portion has a contoured surface with depressions adapted to receive fingers of an operator.

23. The assembly of claim 22, further comprising a dosimeter, the dosimeter being housed in the holder.

* * * * *